United States Patent Office 3,464,548
Patented Sept. 2, 1969

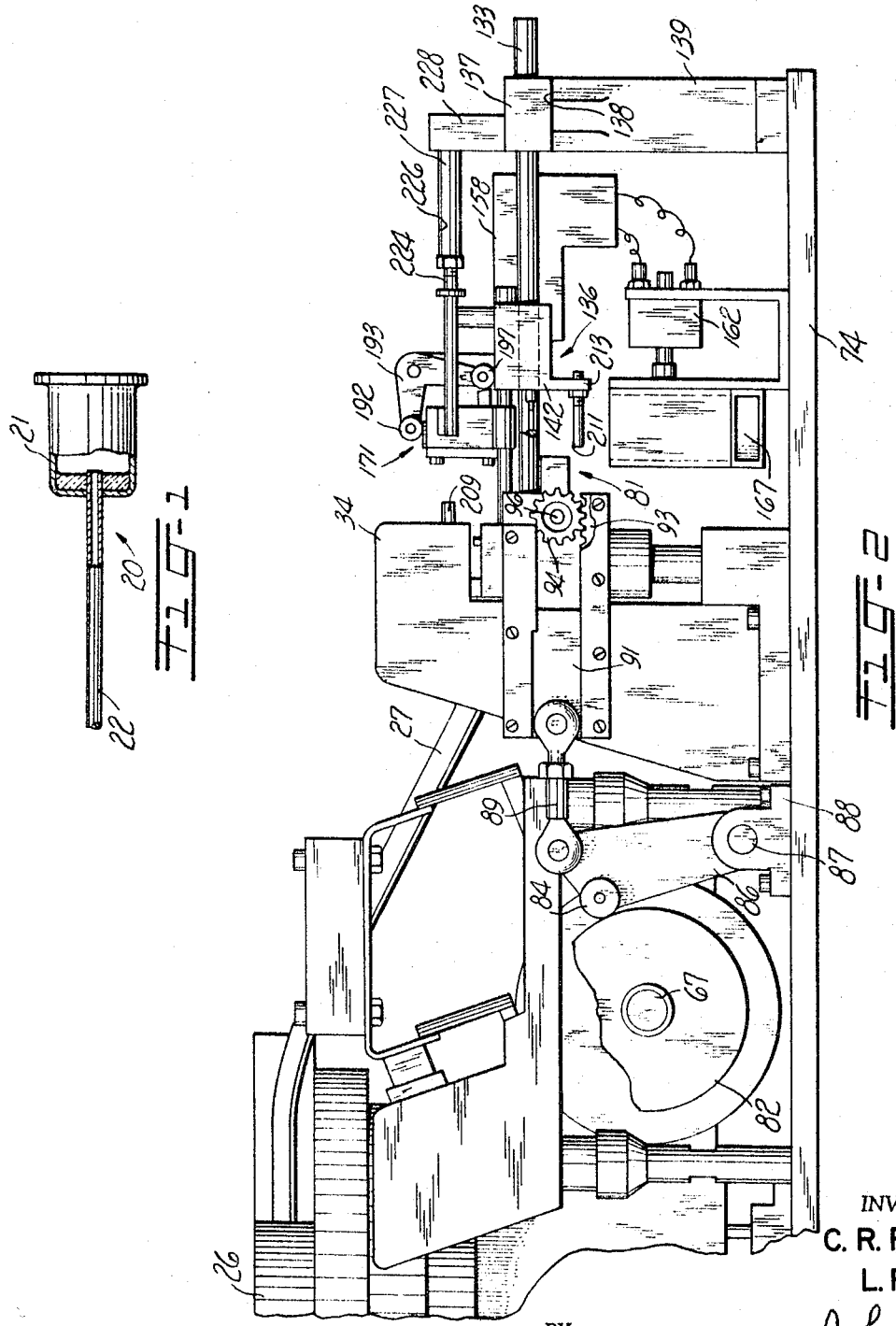

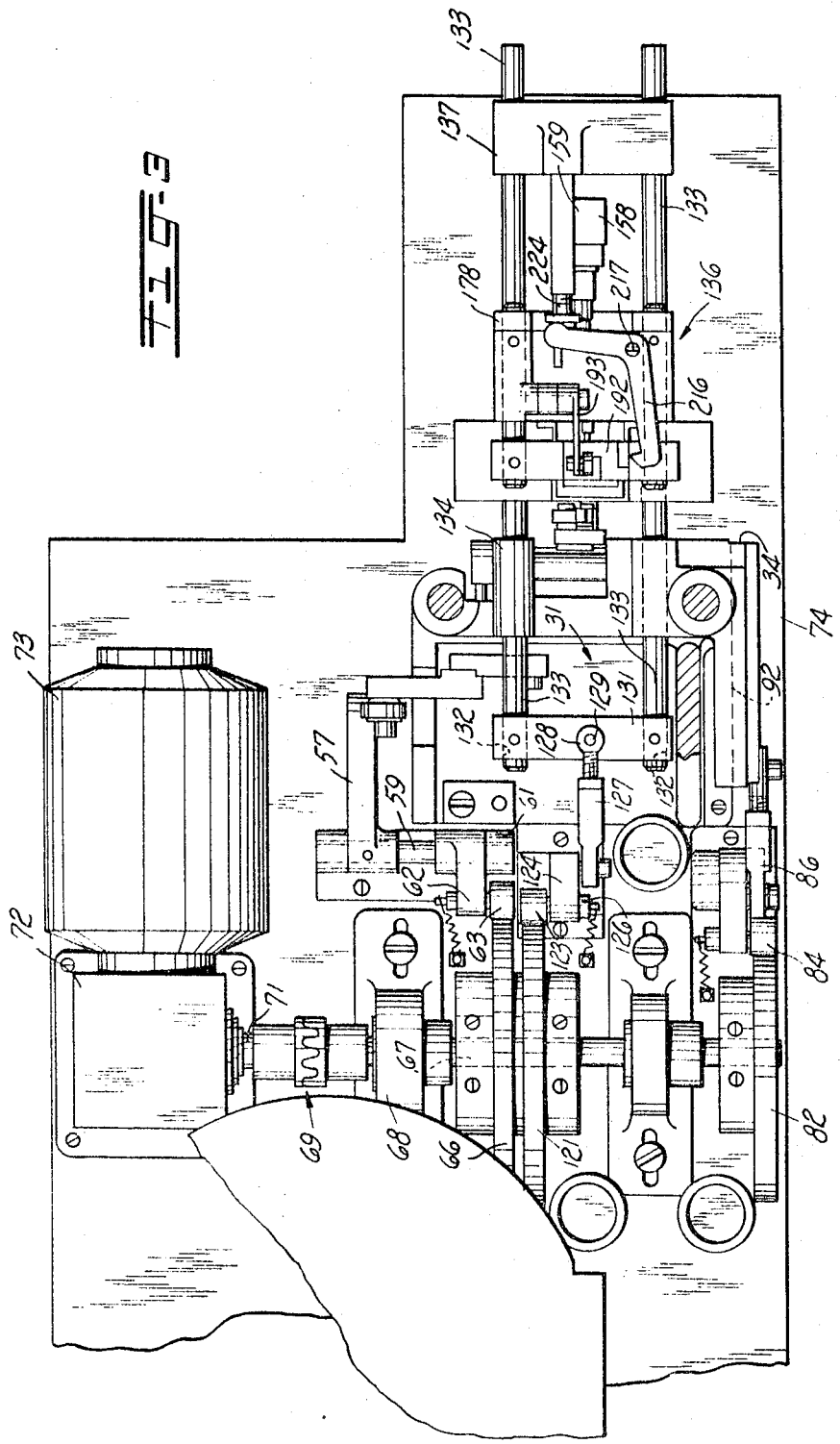

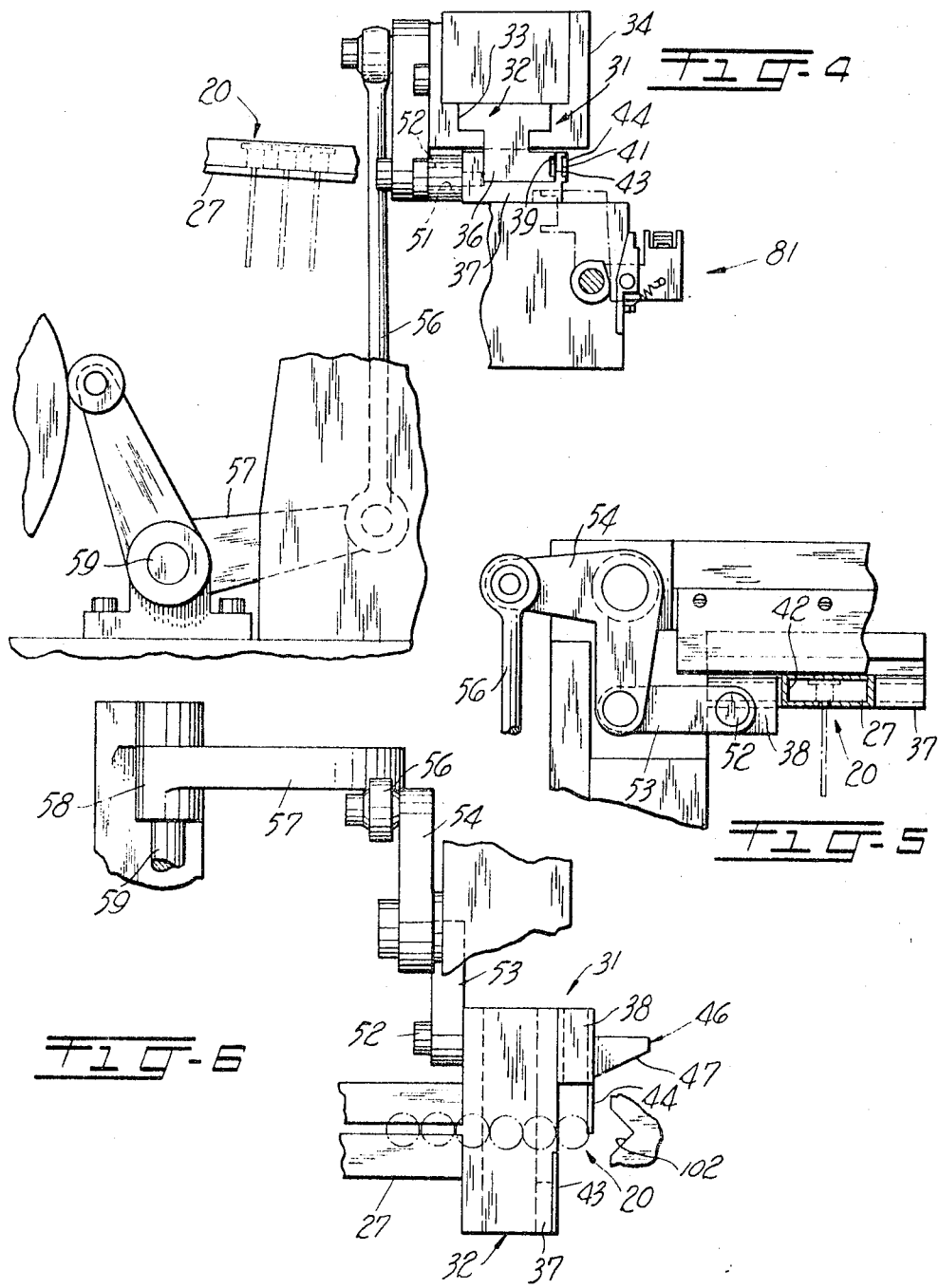

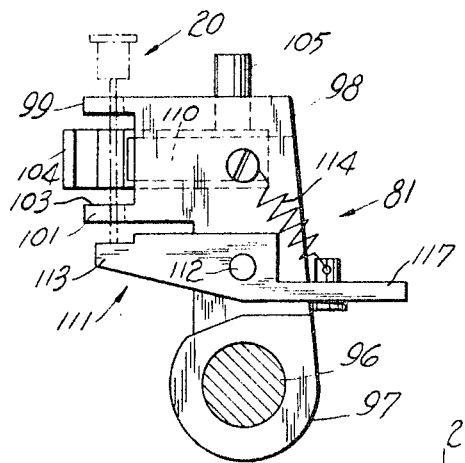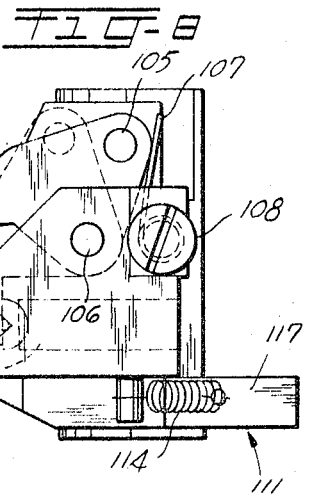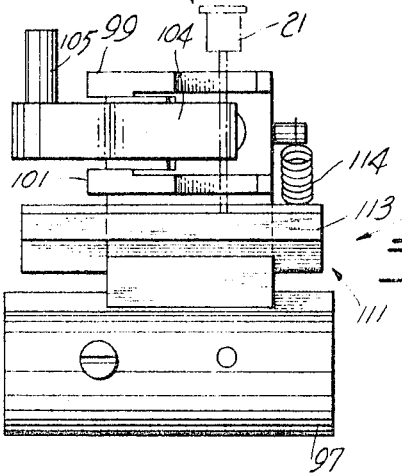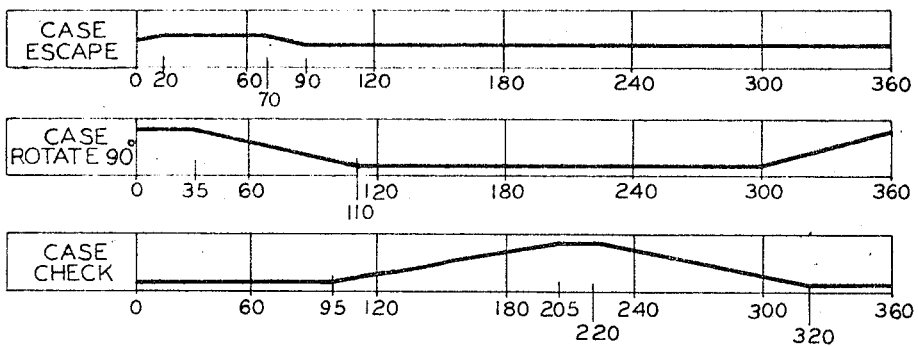

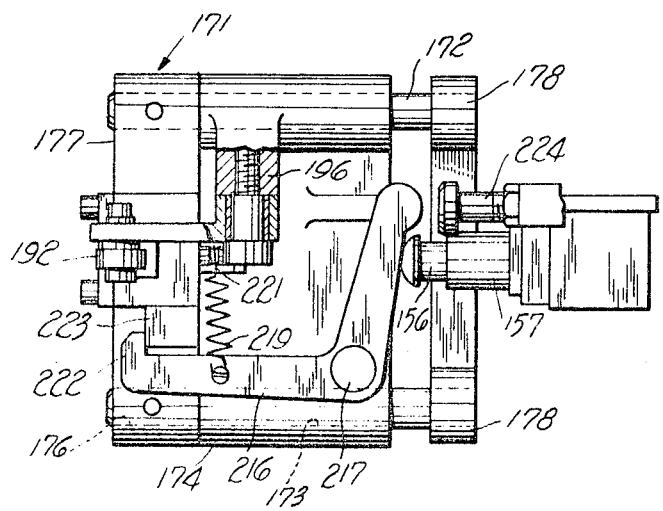
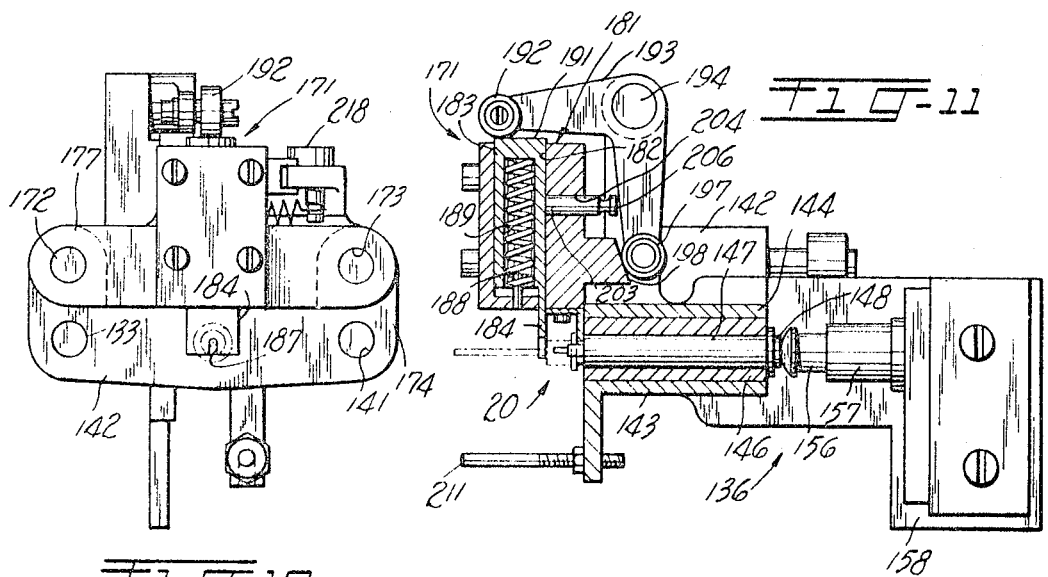

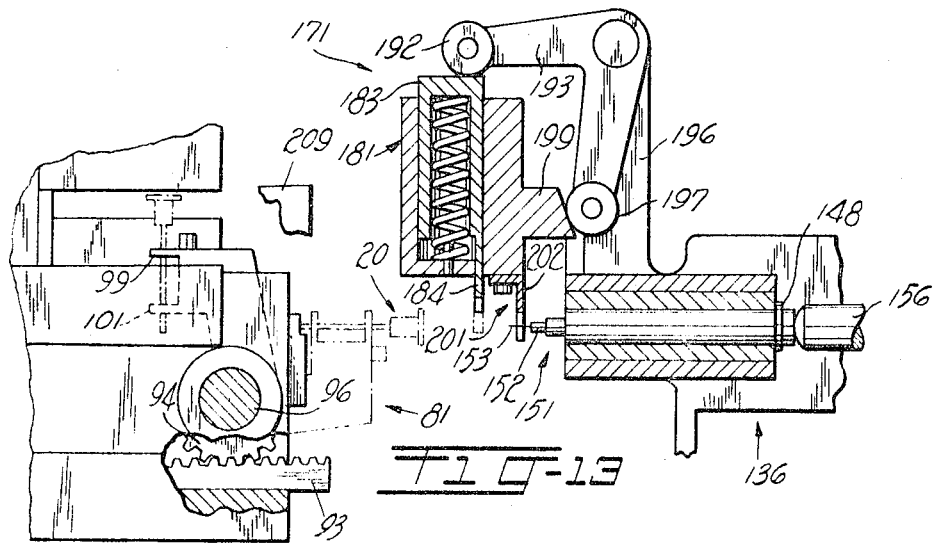

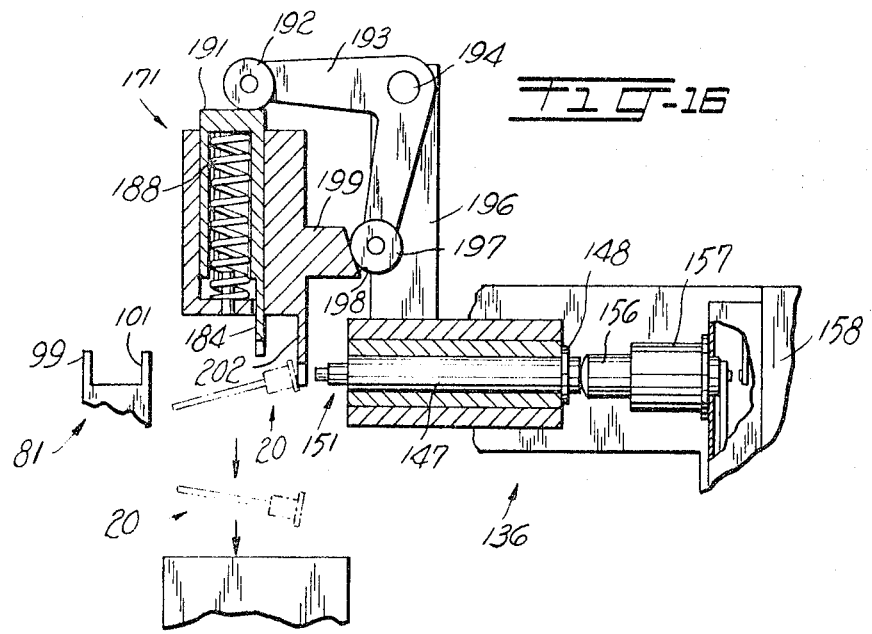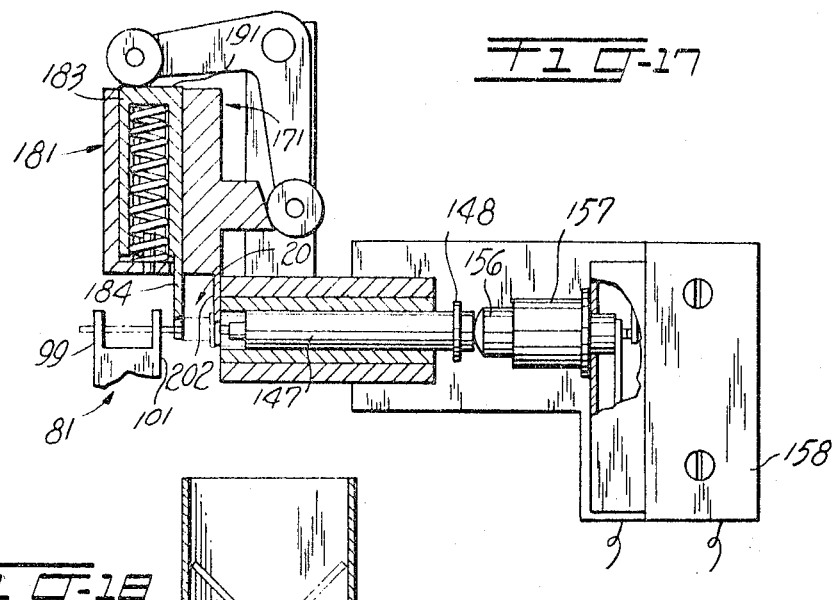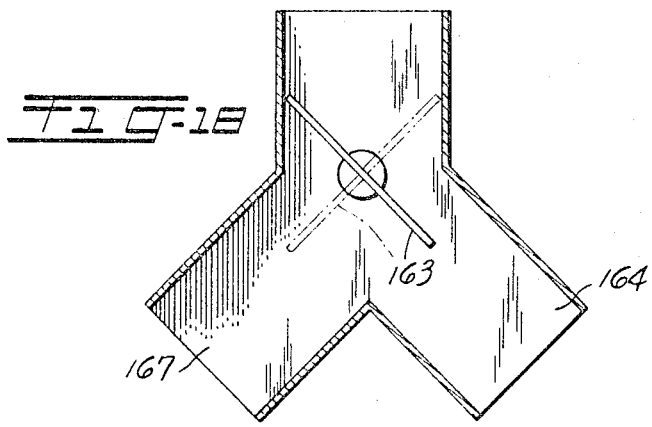

3,464,548
GAUGING AND SORTING APPARATUS
Charles R. Fegley, Laureldale, and Lorenz Regneth, Wyomissing, Pa., assignors to Western Electric Company, Incorporated, New York, N.Y., a corporation of New York
Filed Dec. 13, 1967, Ser. No. 690,129
Int. Cl. B07c 5/02
U.S. Cl. 209—74                    12 Claims

ABSTRACT OF THE DISCLOSURE

A sensing mandrel is advanced into a can and a tubulation of a diode casing which is held horizontally on a support. If the mandrel moves into the can and tubulation, a sorter plate positioned beneath the casing is retained in an aspect position. If the can is not concentric, or the tubulation is obstructed, the mandrel is blocked and a sorter plate is moved into a reject position. Upon withdrawal of the mandrel, an eject device which straddles the can pulls the casing from the support and then releases the casing to drop against the sorter plate which directs the casing into either an accept bin or a reject bin.

BACKGROUND OF THE INVENTION

Field of the invention

This invention relates to an apparatus for automatically gauging and sorting articles, and more particularly, to an apparatus for advancing a sensing member into engagement with a diode casing having a tubulation, glass-sealed to a concentric can of a larger diameter, whereafter the casing is sorted into a reject bin in the event that the casing is not concentric, of if there is an obstruction within the tubulation.

Description of the prior art

In the past, in the assembly of diodes, for example, an operator would, in a controlled atmosphere, assemble manually a diode casing with the diode. Should a gold wire extending from the diode not enter the tubulation of the diode casing, the operator was alerted to the fact that there existed an obstruction within the tubulation and, therefore, discarded the unacceptable diode casing and used another for the assembly with the diode.

The apparatus for gauging and sorting diode casings is related to other apparatus, such as that disclosed in U.S. Patent 3,341,682, which, in combination, completely and automatically assembles the diode. In order to assemble the diode automatically, it is necessary that the gauging and sorting of the diode casings also be accomplished automatically. Otherwise, an operator would have to manually inspect the diode casings, which, of course, would detract from the overall efficiency of the automatic operation, and the savings effected from the automatic machinery of the related manufacturing apparatuses would be consumed in manually checking the casings. There is a need for a high speed gauging and sorting apparatus for the diode casings so that no operator is required for surveillance of the parts used in the assembly operation. In this way, the only manual operation would be in certain aspects of the supply of the various parts to vibratory hoppers incorporated into the automatic apparatus.

Actually manufacturing experience has proved that somewhere between two and three percent of the diode casings are glassed over, or, in other words, the glass used to seal the tubulation to the can has run into the casing to present an obstruction to the entrance of the gold wire of the diode. In the event that the gold wire of the diode was advanced into an obstructed tubulation, the fine gold wire could be crushed, which would result in a wasted effort in the attempted assembly of wires in defective casings. If the machine may operate at somewhere between 2 and 3,000 assemblies per hour, and two to three percent of the casings are defective, this would result in substantial additional cost of wasted product being added onto the cost of the final and acceptable diodes.

Moreover, the defective, nonassembled, diode casing may fall from the assembly station into the apparatus mechanisms when the fine gold wire of the diode does not enter the tubulation. This may result in the apparatus having to be shut down somewhere between 40 and 90 occurrences per hour with two to three minutes per down time in order to clear out the machine. It is clear that these examples of what could happen without the employment of some automatic gauging and sorting apparatus for the diode casing would rapidly consume any advantages gained by using automatic machinery in the assembling of the diodes.

It is an object of this invention to provide a new and improved gauging and sorting apparatus for simultaneously checking the concentricity of two assembled hollow members and for determining whether or not the members are obstruction free.

SUMMARY OF THE INVENTION

With these and other objects in mind, the present invention contemplates a sorting apparatus which includes a sensing member which is advanced into engagement with an article having an elongated hollow member concentrically mounted on a second hollow member of a larger diameter than the elongated member, so that if the sensing member is successfully moved into the hollow members, a sorter plate is retained in an accept position. Conversely, if the hollow members are not concentric, or if the elongated member is obstructed, the sensing member does not enter the article and the sorter plate is actuated into a reject position.

More particularly, diode casings, having a can with a tubulation joined thereto, are individually held horizontally on a supporting member whereafter a sensing mandrel, having a projecting wire, is advanced into an open end of the can. If the sensing mandrel and the wire extending therefrom move successfully into the can and the tubulation, the sorter plate, which is positioned beneath the diode casing, is retained in an accept position. Conversely, if the can is not concentric, or if the tube or the can is obstructed, the sensing mandrel and the wire extending therefrom are blocked from movement into the diode casing, and as a result, a switch is operated to control the movement of the sorter plate into a reject position.

After the sensing step, an eject device is moved to engage the casing on each side of the can, and upon withdrawal of the sensing mandrel, the eject device pulls the casing from the support. The eject device is then moved out of engagement with the casing and simultaneously pulls the casing from the sensing mandrel after which the casing drops against the prepositioned sorter plate. The prepositioned sorter plate then directs the diode casing into either an accept bin or a reject bin.

Other objects and advantages of the present invention will be apparent from the following detailed description when considered in conjunction with the accompanying drawings.

BRIEF DESCRIPTION OF THE DRAWING

FIG. 1 is a side view, partially in section, of a tubulated can that is to be gauged and sorted by the apparatus shown in the other drawings;

FIG. 2 is a front elevational view of an automatic gauging and sorting apparatus embodying the principles of the invention;

FIG. 3 is a top plan view of the automatic gauging and sorting apparatus shown in FIG. 2;

FIG. 4 is a front elevational view of an escapement mechanism for releasing successive individual articles from a feed track to a transfer mechanism;

FIG. 5 is an end elevational view of the escapement mechanism shown in FIG. 4;

FIG. 6 is a top plan view of the escapement mechanism shown in FIG. 6 and showing a leading casing in the feed track in position for release to the transfer mechanism;

FIG. 7 is a front elevational view, partially in section, of the transfer mechanism in an upright position for receiving the leading diode casing from the escapement mechanism;

FIG. 8 is a top view of the transfer mechanism when in the position shown in FIG. 7 and showing a latch pivotally moved to uncover a pair of V-shaped grooves for receiving the diode casing;

FIG. 9 is a side elevational view of the transfer mechanism as viewed from the left side thereof in FIG. 7 and showing the latch moved to a closed position over the tubulation of the casing to hold the casing securely within the V-shaped grooves;

FIG. 10 is a top view of an eject device mounted for movement on a carriage which is slidably mounted for movement toward and away from the transfer mechanism;

FIG. 11 is a front elevational view, partially in section, and showing the eject device in relation to the carriage with a sensing mandrel mounted in the carriage for engagement with the diode casing;

FIG. 12 is an end view of the eject mechanism and carriage as viewed from the left in FIG. 11 and showing the rods on which the carriage is mounted and a pair of rods by which the eject device is mounted for movement on the carriage;

FIG. 13 is a front elevational view showing the eject device and the carriage in relation to the transfer mechanism with the transfer mechanism shown in full lines for receiving a casing and in broken lines for holding the casing for engagement by the sensing mandrel on the carriage;

FIG. 14 is a front elevational view, partially in section, and showing the apparatus after the eject device and carriage have been advanced to move the sensing mandrel into the diode casing held in the transfer mechanism with the tubulation positioned horizontally;

FIG. 15 is a top plan view of the carriage and eject device and showing a latch in broken lines which locks against the eject device and the carriage after a predetermined movement toward the diode casing shown in FIG. 13;

FIG. 16 is a front elevational view of the apparatus after the carriage and eject device have withdrawn the diode casing from the V-shaped grooves in the transfer mechanism and the eject device has stripped the casing off the mandrel to allow the casing to drop into a sorting bin;

FIG. 17 is a view of the apparatus in FIG. 14 showing the sensing mandrel stopped by an imperfect casing while the carriage has continued to move to the left;

FIG. 18 is a side elevational view of the sorting bin shown in FIG. 16 as viewed from the left in that figure; and FIG. 19 is a timing diagram showing the contours for a series of cans for operating the various component mechanisms.

DETAILED DESCRIPTION

Referring now to FIG. 1, there is shown a diode casing 20 comprising a can 21 and a tube or tubulation 22 extending from one end thereof. The tubulation 22 is joined to the can 21 by melting a glass preform prepositioned over the tubulation and in contact with the can 21. An important step in the manufacture of the diode is to gauge the casing 20 to determine if the can 21 is circular in cross-sectional shape and concentric with the tubulation and, further, whether or not there are any bends or obstructions in the tubulation.

GENERAL DESCRIPTION

Referring now to FIGS. 2 and 3, for a general description of the major apparatus components and mode of operation of these components in gauging and sorting the diode casing 20, there is shown a transfer mechanism, designated generally by the numeral 81, that is loaded individually with the diode casings. The diode casings are supplied from a vibratory hopper 26, through an escapement mechanism, designated generally by the numerals 31, to the transfer mechanism 81. The transfer mechanism 81 receives the diode casings in a generally vertical position after which the transfer mechanism moves to orient the casings horizontally. After the diode casing 20 is oriented in a horizontal position, a slidably movable carriage, designated generally by the numerals 136, is advanced toward the diode casing to move a sensing mandrel 151 (see FIG. 2) within the diode casing.

Simultaneously, an eject device, designated generally by the numerals 171, is moved downwardly to hold the diode casing against the mandrel 151 so that when the carriage 136 is moved reciprocably away from the transfer mechanism 81, the diode casing 20 is supported against the mandrel. As the carriage 136 is moved away from the transfer mechanism 81, the eject device 171 is moved out of engagement with the diode casing 20 to permit the diode casing to drop from the mandrel 151 into a sorting bin 99. In the event that the diode casing 20 is unacceptable, the mandrel 151 is moved within the carriage 136 to actuate a switch and energize a solenoid to position a sorting vane or plate 163 (see FIG. 18) to direct the diode casing 20 to a reject bin (not shown).

ESCAPEMENT MECHANISM

Referring now to FIGS. 2, 3 and 4, there is shown a vibratory hopper 26 for advancing individually and serially a plurality of diode casings 20 along a guideway 27 into engagement with the escapement mechanism 31.

The escapement mechanism 31 (see FIGS. 4, 5 and 6) includes a slidably movable T-shaped block, designated generally by the numeral 32, which is received in a guide slot 33 in a frame 34 for the apparatus. The T-shaped block 32 has a stem portion 36 which has a projecting portion 37 at one end thereof and a projecting portion 38 at the other end thereof (see FIG. 6). Moreover, each of the projecting portions 37 and 38 has a rectangular slot 39 and 41 formed therein, respectively (see FIG. 4).

The projecting portions 37 and 38, together with the guideway 27, define an opening 42 through which the diode casings 20 are advanced serially and individually (see FIG. 5). It should also be observed from FIG. 6, that the projecting portions 37 and 38 are offset both laterally and longitudinally with respect to the guideway 27. A resilient finger 43 is received in the slot 39 and secured to the projecting portion 37. The finger 43 extends into the opening 42 and extends slightly into the guideway 27. Similarly, a second resilient finger 44 is received in the slot 41 and is secured to the projecting portion 38 of the T-shaped block 32. However, the finger 44 projects into the opening 42 so that the free end thereof is slightly to the left of the longitudinal center line of the guideway 27, as viewed in FIG. 5.

Considering now the facilities for operating the escapment mechanism 31, the T-shaped block 32 has a threaded bore 51 in which is received a pin 52, as shown in FIG. 4. The pin 52 extends through one end of a link 53 which is connected to a bell crank 54 which in turn is connected at one end thereof to a rod 56 (see FIGS. 5 and 6). The rod 56 is also joined to one end of a lever 57 having a hub 58 formed integrally therewith and which is secured to a rotatably mounted axle 59. The axle 59 extends through a second hub 61 which is formed integrally on one end of a lever 62 (see FIG. 3). The other end of the lever 62 is pinned to a cam follower 63 which rides on the circumference of a first cam 66. The first cam 66 is mounted on a shaft 67 (see FIG. 3) which extends through a bearing 68 to one side of a flexible coupling, designated generally by the numerals 69. The other side of the flexible coupling 69 is mounted on a stub shaft 71 extending from a gear reduction unit 72 which is driven by a motor 73 (see FIG. 3). The motor 73 and the bearing 68, as well as the frame 34, are supported on a base 74 (see FIG. 2).

As the cam 66 rotates, motion is transmitted through lever 62, rod 56, crank 54 and link 53 to reciprocate the block 32 whereupon the fingers 43 and 44 move in and out of the guideway 37 to release successive diode casings for movement into the transfer mechanism 81.

In addtiion, the T-shaped block 32 of the escapement mechanism 31 has a camming block, designated generally by the numeral 46, secured to the projecting portion 38. As can best be seen in FIG. 6, the camming block 46 has an inclined surface 47 which acts to open the transfer mechanism 81 to receive a diode when the escapement mechanism is reciprocably moved.

TRANSFER MECHANISM

Attention is next directed to the transfer mechanism 81 which is also driven by a mechanical arrangement operated by the motor 73 (see FIGS. 7, 8 and 9). As shown in FIGS. 2, and 3, the shaft 67 has a second cam 82 mounted thereon. The second cam 82 is engaged by a cam follower 84 (see FIG. 2) that is attached to an upper end of a lever 86. The lever 86 is pivotally mounted about a pin 87 carried in a bearing block 88 which is supported on the base 74.

A turnbuckle 89 is pinned to the lever 86 adjacent the cam follower 84 (see FIG. 2). The other end of the turnbuckle 89 is pinned to a reciprocably movable slide 91 which is received in a rectangular slot 92 formed in the frame 34, as shown in FIGS. 2 and 3. The bottom of the slide 91 is fastened to a gear rack 93, the right-hand end of which, as viewed in FIG. 2, meshes with a pinion 94. The pinion 94 is fixedly mounted to one end of a shaft 96 which is used to rotate the transfer mechanism 81 through ninety degrees to orient a diode casing with a longitudinal axis thereof from a generally upright position to the horizontal position shown in broken lines in FIG. 13.

The shaft 96, as viewed in FIG. 3, extends through a hub 97 which is securely mounted to the shaft (see FIGS. 7 through 9). The hub 97 is connected to a carrier 98 which includes a pair of spaced holding elements 99 and 101. The spaced holding elements 99 and 101 have V-shaped notches 102 for receiving the tubulation 22 with the bottom of each notch rounded to conform to the peripheral surface of the tubulation of the casing 20.

The spaced holding elements 99 and 101 of the carrier 98 span a transverse slot 103 which receives a latch 104 that is pivotally mounted about a stud shaft 106. A leaf spring 107 is fastened to a pin 108 extending through the carrier 98 and bearing against a right-hand end of the latch 104, as viewed in FIG. 8. The leaf spring 107 is attached to engage and urge the latch 104 into position to hold the tubulation 22 of a diode casing 20 within the notches 102 formed in the holding elements 99 and 101. Mounted within the carrier 98 is a permanent magnet 110 which is effective to act upon the paramagnetic tubulation 22 of the diode casing 20 to further hold the diode casing within the V-shaped notches 102. An actuator pin 105 extends outwardly from the latch 104 to engage and ride along the inclined surface 47 of the camming block 46 to pivot the latch about the stud shaft 106 so that a casing 20 can be received in the holding elements 99 and 101.

Additionally, a set screw 109 is fastened to the frame 34 (see FIG. 13) and is positioned to engage the latch 104 after the transfer mechanism 81 is rotated clockwise to move the diode casing 20 from a substantially vertical position to a horizontal position. In this way, the latch 104 will be positively seated against the tubulation 22 to assist the leaf spring 107 in urging the latch counterclockwise, as viewed in FIG. 8, to firmly hold the diode casing for the gauging operation.

In order to accurately position the tubulation 22 longitudinally within the V-shaped notches 102 for the subsequent gauging operation, a lever, designated generally by the numerals 111, is provided. The lever 111 is pivotally mounted on a shaft 112 and has a laterally extending arm 113 underlying the V-shaped notches 102 in the holding elements 99 and 101. A spring 114 interconnects the carrier 98 and another arm 116 of the lever 111 to urge the arm 113 away from the end of the tubulation 22. However, the lever 111 is provided with still another arm 117 which is engaged by the carriage 136 to exactly limit movement of the carriage when the transfer mechanism is in the horizontal position and the carriage is advanced into the gauging position. Simultaneously, the advance and engagement of the carriage slightly pivots the lever 111 against the action of the spring 114 to urge and shift the tubulation 22 along the holding elements 99 and 101 to precisely position the casing 20 for the gauging operation.

CARRIAGE AND GAUGE MECHANISM

A third cam 121 is mounted on the shaft 67 (see FIG. 3) between the first cam 66 and the second cam 82. The third cam 121 drives a follower 123 which is pinned to a crank arm 124 having a stud pivotally mounted in a bearing 126 that is supported on the base 74. As can be seen in FIG. 3, the crank arm 124 is pinned to one end of a turnbuckle 127. The other end of the turnbuckle 127 has an eye 128 formed therein through which extends a pintle 129 that is mounted in a crossbar 131. Each end of the crossbar 131 has an opening 132 formed therethrough for receiving one end of a slidably movable carriage rod 133. Each carriage rod 133 is fixedly secured within an opening 132 of the crossbar 131.

Moreover, the carriage rods 133 extend to the right, as viewed in FIGS. 2 and 3, through bearings 134, which are mounted in the frame 34, and bearings 137. The bearings 137 are positioned in an opening 138 of a standard 139 which is supported on the base 74. With this arrangement, as the crossbar 131 is moved by the turnbuckle 127, the carriage rods 133, which are fixedly attached to the crossbar, slide within the bearings 134 and 137. The linear movement of the rods 133 is also used to move reciprocably a carriage, designated generally by the numeral 136, fixedly mounted on the rods which extend through openings 141 formed in a carriage frame 142 (see FIG. 12).

The frame 142 has an opening 143 formed therein (see FIG. 11) to receive a bearing 144 and a sleeve 146 disposed concentrically within the bearing. An actuator member 147 is slidably mounted within the sleeve 146 and has a collar 148 at the right-hand end thereof, as viewed in FIG. 11, to limit the travel thereof to the left. Moreover, the left-hand end of the actuating member, as viewed in FIGS. 13 and 16, has a sensing or gauging mandrel, designated generally by the numerals 151, projecting therefrom. The mandrel 151 is formed with a stub portion 152 which coincides with the inner cavity of a satisfactory can 21, and a wire-like extension 153 for projecting into a satisfactory tubulation 22. Furthermore, the length of the wire-like extension 153 is such that when the mandrel 151 is placed within a diode casing 20, the wire-like extension projects slightly past the joint of the tubulation 22 and the can 21.

The right-hand end of the actuating member abuts a plunger 156 which extends through a bushing 157 into a housing 158. As is best seen in FIG. 3, the housing 158 is secured to an upstanding plate 159 that is supported from the base 74. The plunger 156, normally biased to the left against the actuator member 147, as viewed in FIG. 11, is mounted to contact a switch 161 positioned within the housing 158. The switch 161 is electrically connected to a solenoid 162 that controls the position of a sorting vane 163 to expose a shute 164 which leads to an accept bin or a chute 167 which leads to a reject bin (see FIGS. 2 and 19). The diode casings 20 are ejected against the sorting vane 163 by the movement of the carriage 136 cooperating with an independent eject device, designated generally by the numeral 171 (see FIG. 17).

EJECT DEVICE

The eject device 171 (see FIGS. 10, 11 and 12) is mounted on a pair of rods 172 with one end of each of the rods slidably mounted in a bore 173 formed through projecting bosses 174 on the carriage frame 142. A left-hand end of each of the rods 172 is received in an opening 176 formed in a frame 177 of the eject device 171 and secured therein. In order to prevent the rods 172 from pulling out of the projecting portion 174 of the carriage 136, a collar 178 is secured to the right-hand end of each of the rods (see FIG. 10). As the carriage 136 is fixedly attached to the carriage rods 133 so that the carriage 136 and rods 133 slide in unison, so the eject device 171 is movable with the rods 172. Moreover, the eject device 171 is movable with, or independently of, the carriage 136. The length of the rods 172 is determined in accordance with the maximum movement of the eject device 171 relative to the carriage 136 by the mechanism to be hereinafter described.

The eject device 171 has mounted on the left-hand end thereof (see FIG. 11) a housing, designated generally by the numerals 181, having an opening 182 formed therein. A slidably movable plug 183 is positioned within the opening 182 of the housing 181 and has a finger 184 formed on the bottom thereof and projecting through an opening 186 in the bottom of the housing 181. A lower end of the finger 184 has a V-shaped groove 187 formed therein (see FIG. 12) for reasons which shall become readily apparent. Moreover, the apex of the groove 187 is rounded to coincide with the periphery of the tubulation 22 of the casing 20.

The plug 183 is biased upwardly by a compression spring 188 positioned within an opening 189 formed in the plug 183 (see FIG. 11) so that a top surface 191 of the plug normally extends above the top surface of the housing 181 of the eject device 171. The upper surface of the plug 183 is constantly in engagement with a roller 192 which is pinned to one end of a bell crank 193 which is pivotally mounted by a pin 194 that extends into an upright supporting leg 196 attached to the frame 142 of the carriage 136 (see FIGS. 11 and 16).

The bell crank lever 193 has a second roller 197 rotatably pinned to a lower end thereof which engages an inclined camming surface 198 formed on a projecting portion 199 of the housing 181 (see FIG. 16).

As can best be seen in FIG. 13, a short length of angle bar, designated generally by the numeral 201, is attached to the underside of the housing 181 with a vertical stripper leg 202 extending downwardly toward the longitudinal center line of the actuator member 147. The leg is provided with a vertical slot of sufficient width to permit the passage therethrough of the gauging mandrel 151, but the slot is narrow enough to engage the flanged rim of can 21.

Finally, the housing structure 181 of the eject mechanism 171 is guided slidably along the rods 172 by a short pin 203 that extends slidably into a bore 204 in the housing. The short pin 203 has a head 206 that is fixed within a cavity 207 formed in an upright leg 196 of the carriage 136 (see FIG. 11).

In order to limit the forward or leftward movement of the eject device 116, a stop 209 is positioned, as shown in FIG. 13. Moreover, to halt the advance of the carriage 76, a stroke gauge, designated generally by the numeral 211, is mounted on the carriage 136 and extending through an opening formed in a projecting ear 213 of the carriage frame 142. As previously mentioned, the stroke gauge 211 engages the third arm 117 of the lever 111 on the transfer mechanism 81 to exactly position the tubulation 22 of the diode casing within the V-notches of the holding elements 99 and 101.

Although the carriage 136 and eject device 171 are movable relative to one another, the two carriages may be locked together for movement in unison. Referring now to FIGS. 3, 10 and 16, there is shown a latching lever 216 which is pivotally mounted on a pin 217 fastened into the top of the carriage frame 142 (see FIG. 12). As can best be seen in FIG. 10, the lever 216 is biased in a clockwise direction by a tension spring 219 which is secured to a pin 221 on the frame 142. The lever 216 is formed with a pawl 222 on one end thereof with the pawl adapted to catch over a catch block 223 to lock the carriage 136 and the housing 181 together. The latching lever 216 is positioned at an elevation so that the lever can be engaged by a stop member 224 that may be adjustably located within a bore 226 of a horizontal support member 227. The horizontal support member 227 is supported from a stanchion 228 that rests on the base 74.

OPERATION

Referring now to FIGS. 2 and 3, a plurality of diode casings 20 are advanced serially and with the tubulation 22 in a substantially vertical orientation from the vibratory hopper 26 along the guideway 27 until the leading casing engages the resilient escapement finger 44 extending from the projecting portion 38 of the T-shaped block 32.

As can be seen from the timing diagram in FIG. 19, the cycle of operation begins with the second cam 82 rotating a lobe portion to move the cam follower 84 to move pivotally the lever 86 in a clockwise direction, as viewed in FIG. 2. The lever 86 urges the slide 91 to the right, as viewed in FIG. 2, within the slot 92 to move the gear rack 93. The gear rack 93 meshes with the pinion 94 and rotates the pinion counterclockwise to turn the transfer mechanism 81 from the broken line position, shown in FIG. 13, to the full line position to receive a casing 20.

As the transfer mechanism is moved into a substantially upwardly position, the pin 105 cams against the inclined surface 47 of the camming block 46 to overcome the biasing force of the leaf spring 107 and pivot the latch 104 clockwise, as viewed in FIG. 8, to uncover the V-shaped notches 102 in the holding elements 99 and 101. Then the first cam 66 is rotated so that the follower 63 is moved to actuate the lever 62 and turn the shaft 59. The turning of the shaft 59 pivots the lever 57 to move the rod 56 upwardly and, hence, move the bell 54 clockwise, as viewed in FIG. 5. The bell crank 54 urges the link 53 to the left, as viewed in FIG. 5, or upwardly, as viewed in FIG. 6, to move the escapement mechanism transversely across the guideway 27.

Referring now to FIGS. 6 and 19, the movement of the escapement mechanism 31 moves the T-shaped block away from guideway 27 to move the finger 43 further into the opening 42 and between successive diode casings 20, and simultaneously move the finger 44, free of the leading diode, to permit this diode casing to be attracted by the magnet 110 in the now pivoted and aligned transfer mechanism 81. The magnet 110 attracts the leading diode casing 20 to hold the tubulation in the notches 102 against the holding elements 99 and 101.

As the T-shaped block 32 is slidably moved to the left, as viewed in FIG. 5, the camming block 46 is moved away from the actuator pin 105 of the transfer mechanism 81. The leaf spring 107 then urges the latch 102 in a counterclockwise direction, as viewed in FIG. 9, to move the latch into the transverse slot 103 and against the tubulation 22. The tubulation 22 is approximately positioned longitudinally across the holding elements 99 and 101 by the force of the upwardly extending arm 113 of the lever 111 against the lower end of the tubulation, as viewed in FIG. 7.

The movement of the T-shaped block 32 to the left, as viewed in FIG. 5, moves the finger 43 across the guideway 27 to prevent the successive diode casings from being vibrated toward the transfer mechanism 81. When the transfer mechanism 81 is rotated from the upright position to the horizontal position, the T-shaped block is simultaneously moved within the slot 33 in the frame 34 to withdraw the finger 43 away from the guideway 27 and to return the finger 44 into the guideway in the initial position, as shown in FIG. 6, thereupon permitting the next successive diode casing to be vibrated forwardly into engagement with the second resilient finger 44.

As the cam shaft 67 continues to rotate (see FIG. 19), the third cam 121 is turned therewith to move the follower 123 and the crank arm 124 is moved pivotally about the base 74 to move linearly the turnbuckle 127 and initiate forward movement of the carriage 136. More particularly, the movement of the turnbuckle 127 moves the crossbar 131 and the carriage rods 133 which are fastened within the openings 132 of the crossbar.

In the initial cycle of operation, the crossbar 131 first moves to the left, as viewed in FIGS. 2 and 3, and upon moving the carriage 136 to the left and toward the transfer mechanism 81. When the carriage 136 is moved to the left, the carriage urges the eject device 171 toward the left until the eject device engages the stop 209.

After the eject device 171 is moved into engagement with the stop 209, the carriage rods 133 continue to be pulled toward the left to further move the carriage 136 therewith. Consequently, as can be seen in FIGS. 13 and 14, the bell crank 193 will be rotated in a counterclockwise direction as the projecting portion 199 of the now stationary housing 181 presses against the still advancing roller 197. The roller 197 begins to move upwardly along the camming surface 198 to rotate the bell crank lever 193 and move the roller 192 downwardly against the top surface of the plug 183 while the roller 192 advances across the top surface of the plug from the position shown in FIG. 13 to that shown in FIG. 11. The downward movement of the plug 183 against the upward biasing force by the compression spring 188 moves the finger 184 downwardly until the V-shaped groove 187 in the bottom of the finger plate engages the tubulation 22 of the diode casing 20 now held horizontally in the transfer mechanism 81 (as shown by the broken lines in FIG. 13 and full line position in FIG. 14).

At the time the finger 184 starts to descend, the depending leg 202 is positioned adjacent the open end of the can 21, so that the descending finger 184 captivates the body of the can between the descended finger and the leg.

Simultaneously with the advancement of the finger 184 downwardly to engage the tubulation 22 of the diode casing 20, the mandrel 151 is advanced through the slot in the leg 202 and into the diode casing so that the stub portion 152 is received in the can 21 and the wire-like extension 153 is thrust into the tubulation 22. Should the can 21 not be concentric with the tubulation 22, or should there be an obstruction within the tubulation, the mandrel 153 and the actuator member 147 to which the mandrel is attached, will be held stationary. The continued movement of the carriage 136 to the left advances the switch 161 and the plunger 156 against the actuator member 147. The plunger 156 is now held stationary to close the still advancing switch, and thus energize the solenoid 162 to swing the sorting vane 163 so that when the diode casing 20 is ejected subsequently, the diode casing will be directed down the chute 167 and into the reject bin.

Conversely, if the diode casing is acceptable, signifying that the can 21 is concentric with the tubulation 22 and that the tubulation 22 has no obstruction therein, the mandrel 151 will fully enter the diode casing, as shown in FIG. 14, and the switch 161 will not be operated. Therefore, for an acceptable diode casing 20, the sorting vane 163 will remain in a position so as to direct acceptable casings down the chute 164 into the accept bin.

In either event, the movement of the finger 184 downwardly to engage the tubulation 22 and the movement of the mandrel 153 into the casing 20 is accompanied by the movement of the vertical stripper leg 202 of the angle bar 201, (see FIG. 14), into alignment with the flanged rim formed about the open end of the can 21. Therefore, the can 21 of the diode casing 20 is captured between the finger plate 184 and the vertical leg 202 of the angle bar 201 and is supported either fully, or partially, by the mandrel 151 depending on whether or not the diode casing is acceptable, or unacceptable.

Referring now to FIG. 15, as the carriage 136 moves as far to the left as possible, the stroking gauge 211 engages with and slightly pivots the third arm 117 of the lever 111 of the transfer mechanism 81 (see FIG. 14). The lever 111 pivots against the action of spring 114 to move the end 113 against the trailing extremity of the tubulation 22 to accurately position the diode casing 20 for the gauging operation.

At this time, the pawl 222 of the latching lever 216 slips over the end of the catch block 223 (see FIG. 15). Then the tension spring 219 urges the latching lever 216 to pivot about the pin 217 in a clockwise direction to latch the pawl 222 completely over the catch block 223. The positive engagement of the pawl 222 with the catch block 223 effectually locks the carriage 136 and the eject device 171 together for subsequent movement in unison to the right.

As the third cam 121 continues to be rotated by the shaft 67, the crank arm 124 is moved clockwise, as viewed in FIG. 2, to move the turnbuckle 127 and the crossbar 131 to the right. The movement of the crossbar 131 to the right moves slidably the carriage rods 133 to the right through the bearings 134 and 137.

As the carriage rods 133 are slidably moved within the bearings 134 and 137 to the right, as viewed in FIG. 3, the carriage 136 and the eject device 171, which are latched together, as hereinbefore described, are moved in unison until the latching lever 216 engages the stop member 224.

The continued movement of the carriage 136 along with the rods 133 forces the latching lever 216 against the stop member 224 to reactively pivot the latching lever in a counterclockwise direction, as viewed in FIGS. 3 and 15. As the latching lever 216 pivots about the pin 217, the pawl 222 disengages with the catch block 223 to release the eject device 171 from the carriage 136.

Since the carriage 136 is being urged to the right along with the carriage rods 133, the now unlatched eject device 171 is free to move away from the second roller 197. Consequently, the movement of the carriage 136 releases the pressure of the bell crank 193 through the roller 192 against the plug 183, thereupon permitting the plug to be forced upwardly by the compression spring 188 (see FIG. 16). As the plug 183 is biased upwardly against the roller 192, the bell crank 193 is pivoted in a clockwise direction, as viewed in FIG. 16, about the pin 194 thereupon moving the roller 197 against the projecting portion 199 of the eject device 171.

When the roller 197 pushes against the eject device 171, the eject device is moved to the left simultaneously with the upward movement of the finger 184 to free the left end of the diode casing can 21. The stationary vertical leg 202 of the angle bar 201 now acts to strip the can 21 from the mandrel 151 which is mounted on the still moving carriage. In addition, the upward movement of the plunger 183 pivots the crank arm 193 in a clockwise direction to force the cam roller 197 against the abutment 199 so that the entire eject device 171 is forced, or "kicked," toward the left. A small movement toward the leg is thereby imparted to the stripper leg 202 to complete the withdrawal, or stripping, of the diode casing from the mandrel.

Since the diode casing 20 has been pulled, or stripped, from both the holding elements 99 and 101, and the gauging mandrel 151, the casing therewith drops downwardly against the sorting vane 163 to be directed into the appropriate sorting bin.

It is to be understood that the above-identified embodiments are simply illustrative of the principles of the invention and numerous other modifications may be devised without departing from the spirit and scope of the invention.

What is claimed is:

1. In an apparatus for gauging and sorting a hollow case having an open end;
   means for moving each of a plurality of said cases individually and serially into a test position;
   means controllable by predetermined characteristics for sorting said cases;
   means responsive to the movement of one of said cases into said test position for gauging said case and for controlling said sorting means to sort said cases in accordance with said predetermined characteristics;
   means for withdrawing said gauging means from said test position;
   means for engaging said case and withdrawing said case from said test position simultaneous with the withdrawal of said gauging means to position the case over said sorting means; and
   means for subsequently moving said engaging means transversely and longitudinally away from said case to release said case into said sorting means.

2. In a device for stripping an article loaded on a moving mandrel support device;
   a housing movably mounted on said mandrel support device;
   means for latching said housing to move with said mandrel support device;
   a stripper member depending from said housing into a position in alignment with the article;
   means rendered effective by a movement of said mandrel support device for releasing said latching means; and
   means rendered effective by the release of the latching means for moving said housing away from said mandrel support device to move said stripper member to engage and strip said article from said mandrel support device.

3. In an apparatus for gauging articles;
   means for transferring each of a plurality of articles individually and serially into a test position;
   a carriage slidably movable in a first direction toward and in a second direction away from said test position;
   means mounted on said carriage responsive to predetermined characteristics for gauging said articles;
   means for advancing said carriage and said gauging means into engagement with said article in said test position and for then moving said carriage away from said test position;
   means slidably mounted on said carriage for removing said article with said carriage from said test position; and
   means for moving said removing means transversely out of engagement with said article and for simultaneously moving said removing means in said first direction away from said carriage to release said article.

4. In an apparatus for gauging and sorting articles as set forth in claim 3, also including:
   pivotally mounted means attached to said moving means for shifting said article on said moving means; and
   means mounted on said carriage for engaging and pivoting said pivotably mounted means on said moving means upon the advance of said carriage in said first direction to shift said article.

5. In an apparatus for gauging and sorting articles in accordance with said predetermined characteristics as set forth in claim 3 and further including;
   means selectively positioned for engaging each released article; and
   means controlled by said gauging means for positioning said engaging means to sort said articles.

6. In an apparatus for gauging and sorting articles as set forth in claim 5 wherein:
   said carriage has an opening formed therethrough;
   said gauging means includes:
     a sensing mandrel slidably positioned in said opening in said carriage for movement toward said article when said carriage is advanced in said first direction;
     means for urging said sensing mandrel to project from said carriage to move with said carriage toward said article; and
     means actuated by said sensing mandrel engaging said article and slidably moving within said opening for selectively positioning said engaging means.

7. In an apparatus for gauging and sorting articles as set forth in claim 5 wherein:
   means for locking together said carriage and said withdrawing means after said carriage has been advanced a predetermined distance in said first direction;
   means mounted on said carriage contacting said projecting abutment of said housing for urging said holding means toward said article when said carriage and housing are locked together;
   said withdrawing means includes:
     a housing having an opening formed therein, said opening connected by a passageway to the bottom of said housing;
     means slidably mounted in said housing and extending through said passageway for holding said article against said carriage;
     a stripping member spanning said mandrel and aligned with said article;
     a projecting abutment formed on said housing; and
     means responsive to the unlocking of said carriage and said withdrawing means for moving said holding means away from said article and for moving said urging means against said abutment to move said stripping member against said article away from the sensing mandrel to eject said article.

8. In a gauging and sorting apparatus as defined in claim 7:
   said locking means includes a pivotably mounted latch on said carriage for locking said carriage and said withdrawing means together when said carriage advances a predetermined distance in said first direction; and
   a stop member engaged by said latch as said carriage moves in the second direction to release said withdrawing means from said carriage whereupon said moving means overcomes said urging means to eject said article.

9. In a device for removing an article from a moving carrier support;
   a member acting against the article for holding said article on said moving carrier support;
   a stripper member spanning the carrier support and aligned with said article;
   means for releasably latching said holding member and said stripper member to move with said moving carrier support;
   means rendered effective by the movement of said carrier support for releasing said latching means to free the holding member and said stripper member from movement with said carrier support;

means rendered effective by continued relative movement of said carrier support for lifting said holding member away from the article on the moving carrier support; and means actuated by said lifting means for moving said stripper relative to said carrier support to strip and remove the article from said carrier support.

10. In a device for ejecting an article from a moving carrier support;

means for mounting said device on said carrier support to move relative to each other;

means actuated when said carrier support is moved in a first direction to receive an article for locking together said device and said carrier support together to move together as a unit;

a housing;

means depending from said housing for capturing said article to hold said article against said moving carrier support;

means responsive to a predetermined movement of said carrier support and said device in a second direction with said article for unlocking said device from said carrier support; and means responsive to the activation of said unlocking means for moving said capturing means away from and relative to said moving carrier support to release the article.

11. In a device for ejecting articles from a moving carrier support;

means for mounting said device to move slidably in relation to said moving carrier support;

means for locking together said device and said moving carrier support;

a housing having an opening formed therein, said opening connected by a passageway to the bottom of said housing;

an abutment formed on said housing;

a slidably movable member positioned within the opening in said housing, said slidably movable member having a cavity formed therein;

a compression spring received in said cavity for biasing said slidably movable member upwardly to present a top surface thereof above the top surface of the housing;

a stripper member fixedly attached to said housing and depending downwardly between said article and said carrier support;

a finger-like member attached to a lower end of said slidably movable member and extending through said passageway to hold said article against said stripper member and said moving carrier support;

means engaged by said abutment and contacting said upper surface of said slidably movable member for urging said slidably movable member downwardly to move said finger-like member against said article and responsive to an unlocking of said device and said moving carrier support for moving said finger-like member transversely away from said article and said stripper member away from said carrier support to eject said article; and means responsive to a predetermined movement of said article for unlocking said carrier support and said device to permit said housing to move relative to said carrier support.

12. In an apparatus for ejecting an article;

a slidably movable carriage;

a sensing mandrel mounted on said carriage for movement into said article;

a housing mounted for movement on said carriage and having an opening formed therein and connected by a passageway to the bottom of said housing;

a stripping member attached to and extending from said housing over said mandrel and interposed between said article and said carriage;

a projecting abutment formed on said housing, said abutment having a camming surface formed thereon;

a crank lever pivotally mounted adjacent said housing;

a first roller pinned to one end of said lever and engaging said camming surface of said abutment;

a slidably movable member positioned within said opening in said housing, said slidably movable member having a cavity formed therein;

a fork-like member attached to said slidably movable member extending through said passageway toward said article and holding said article against said stripping member;

a second roller pinned to the other end of said lever and engaging the top surface of said slidably movable member to hold said fork-like member in contact with said article;

a latching lever mounted on said carriage and having a toothed end which engages said housing for locking said housing to said carriage to hold said second roller against said slidably movable member;

means for unlocking said latching lever; and a compression spring mounted within the cavity in said slidably movable member and responsive to the unlatching of said lever for urging said slidably movable member upwardly away from said article while simultaneously rotating said crank lever to force said first roller to move along said camming surface and urge said housing away from said mandrel whereupon said fork-like member moves away from said article and said stripping member ejects said article off said mandrel.

References Cited

UNITED STATES PATENTS 3,318,137    5/1967    Denlinger et al. _____ 209—80 X

ALLEN N. KNOWLES, Primary Examiner

U.S. Cl. X.R.

209—80, 82; 214—1